(No Model.)

A. F. DELAFIELD.
ELECTRIC BATTERY.

No. 287,641.  Patented Oct. 30, 1883.

WITNESSES:
C. Neveux
C. Sedgwick

INVENTOR:
A. F. Delafield
BY Munn & Co
ATTORNEYS.

UNITED STATES PATENT OFFICE.

A. FLOYD DELAFIELD, OF NOROTON, CONNECTICUT.

ELECTRIC BATTERY.

SPECIFICATION forming part of Letters Patent No. 287,641, dated October 30, 1883.

Application filed June 1, 1883. (No model.)

*To all whom it may concern:*

Be it known that I, A. FLOYD DELAFIELD, of Noroton, in the county of Fairfield and State of Connecticut, have invented a new and Improved Electric Battery, of which the following is a full, clear, and exact description.

This invention relates to that class of batteries in which the elements are fixed, and the cells are adapted to be raised or lowered.

The object of my invention is to provide means for easily and rapidly filling all the cells with the exciting-liquid, and also to provide means for preventing the surfaces of the cells from coming in contact with each other, thereby preventing undue weakening of the battery.

The invention consists in a box for receiving the cells, which box is provided at the ends with pintles or trunnions resting on a frame, thus permitting the cell-box to be tilted or inclined, so that the superfluous liquid can run from all the cells at the same time, and the level of the liquid will be the same in all cells.

The invention also consists in a cell provided with a boss on each side and on the bottom, for the purpose of preventing the surfaces of the cells from coming in contact with each other or with the sides of the box in which they are contained.

Reference is to be had to the accompanying drawings, forming part of this specification, in which similar letters of reference indicate corresponding parts in all the figures.

Figure 1:
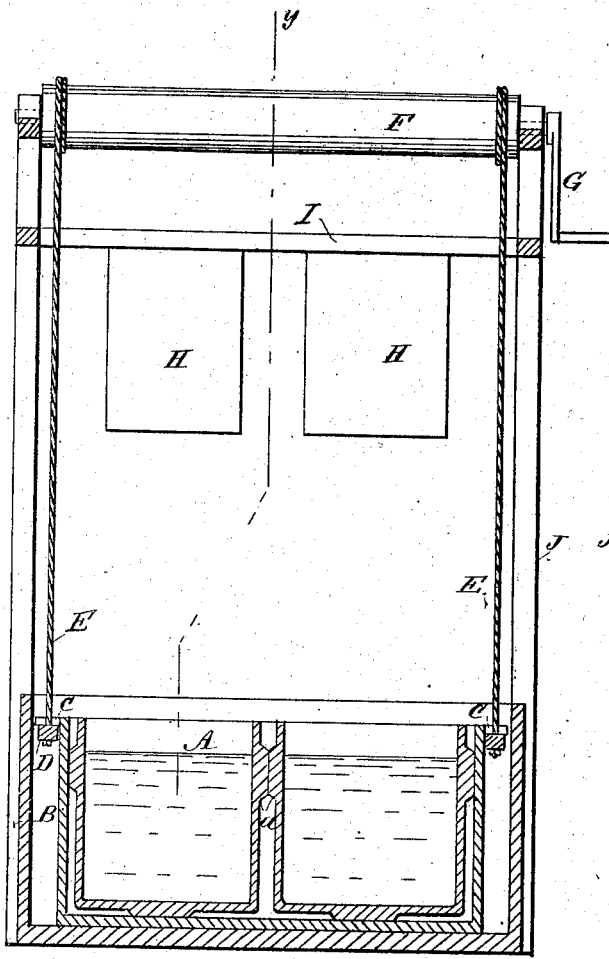
Figure 2:
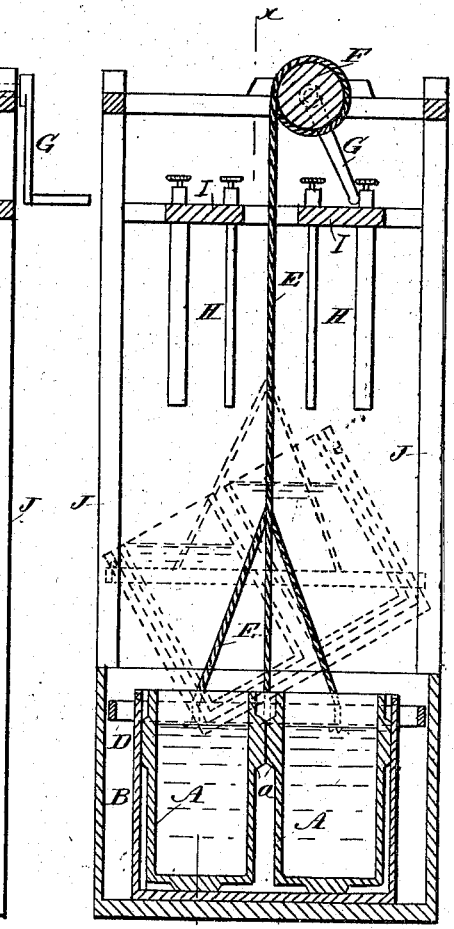
Figure 3:
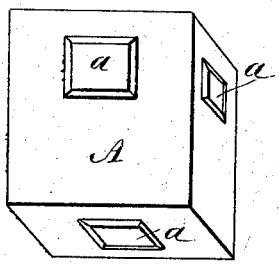

Figure 1 is a longitudinal sectional elevation of my improved battery on line $x\,x$, Fig. 2. Fig. 2 is a cross-sectional elevation of the same on line $y\,y$, Fig. 1. Fig. 3 is a perspective view of the cell.

Any suitable number of cells, A, are placed side by side in a box or framed case, B, provided at each end with a pintle, pivot, or trunnion, C, arranged at the middle or at the sides, which pintles or pivots rest upon a frame, D, surrounding the top of the box or frame B, which frame D must be so much larger than the frame B that the latter can easily be swung within the frame D. The frame D is suspended from cords E, passed over a hoisting-drum, F, provided with a crank-handle, G; or the frame D can be connected with any other suitable devices for raising it. The battery plates or elements H are held on cross-bars I of the frame-work on the box J, adapted to receive the box B.

The cells A, which can be made of glass, earthenware, hard rubber, &c., are provided on the outer surface of the bottom, each end and each side, with a boss or projection, $a$.

If a series of cells are placed in a box, B, the entire surfaces of the cells cannot come in contact with each other, nor with the sides of the box B, as only the bosses can come in contact with each other or with the sides of the box. Thereby weakening of the battery through conduction between the cells is prevented. The exciting-liquid is poured into box J, and it flows over the edges of the cells and fills the same. Then the frame or box B is swung on its trunnions on pivots C until it is more or less inclined transversely. The surplus of exciting-liquid will then flow over the tops of the cells into box J, and will collect on the bottom of the same, and can be drawn off. As all the cells will be inclined or tilted at the same angle, the level of the liquid will be the same in all the cells.

Having thus described my invention, what I claim as new, and desire to secure by Letters Patent, is—

1. In an electric battery, the combination, with a box for receiving the cells, of pivots, pintles, or trunnions projecting from the ends of the box, and of a frame surrounding the box containing the cells, for raising the cells from the containing-box, on which latter frame the trunnions or pintles rest, substantially as herein shown and described, and for the purpose set forth.

2. In an electric battery, the combination, with a box for receiving the cells, of pintles or trunnions projecting from the ends of the box, a frame surrounding the box containing the cells, and adapted to act as pivotal points for the cell-box, and of devices for raising and lowering the said frame, substantially as herein shown and described, and for the purpose set forth.

3. In an electric battery, the combination, with a box for receiving the cells, of pintles or trunnions projecting from the ends of the said box, a frame surrounding the cell-box, and an additional box for receiving the cell-box and the frame surrounding it, so as to provide against drip or leakage into the battery-fluid, substantially as herein shown and described, and for the purpose set forth.

4. A battery-cell constructed with a boss on the outer surface of each side, substantially as herein shown and described, and for the purpose set forth.

5. A battery-cell constructed with a boss on the outer surface of each side and on the bottom, substantially as herein shown and described, and for the purpose set forth.

A. FLOYD DELAFIELD.

Witnesses:
OSCAR F. GUNZ,
C. SEDGWICK.